June 28, 1960 L. O. LARSEN 2,942,637
SCREW HOLDING ATTACHMENT FOR SCREW DRIVER
Filed March 11, 1958
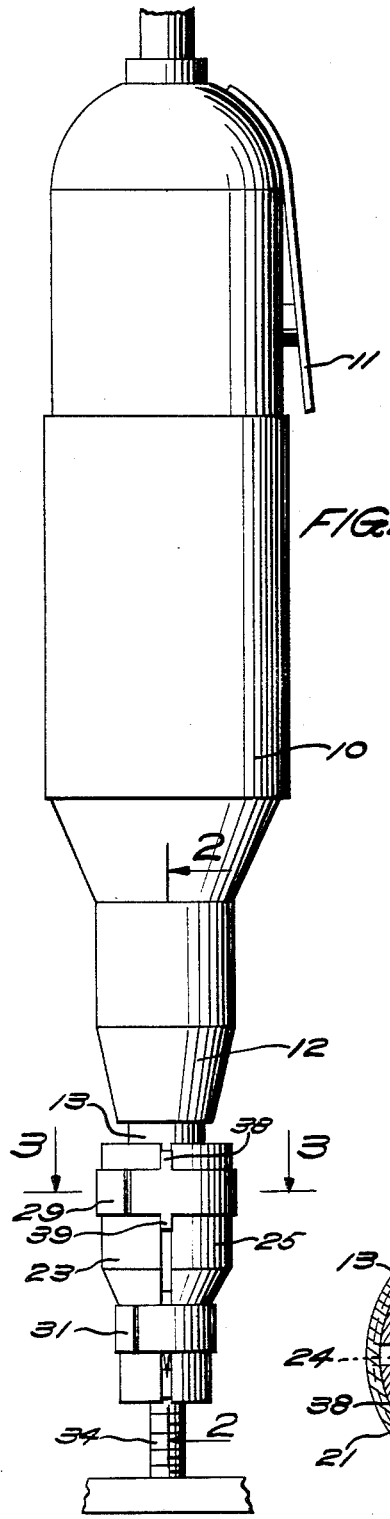
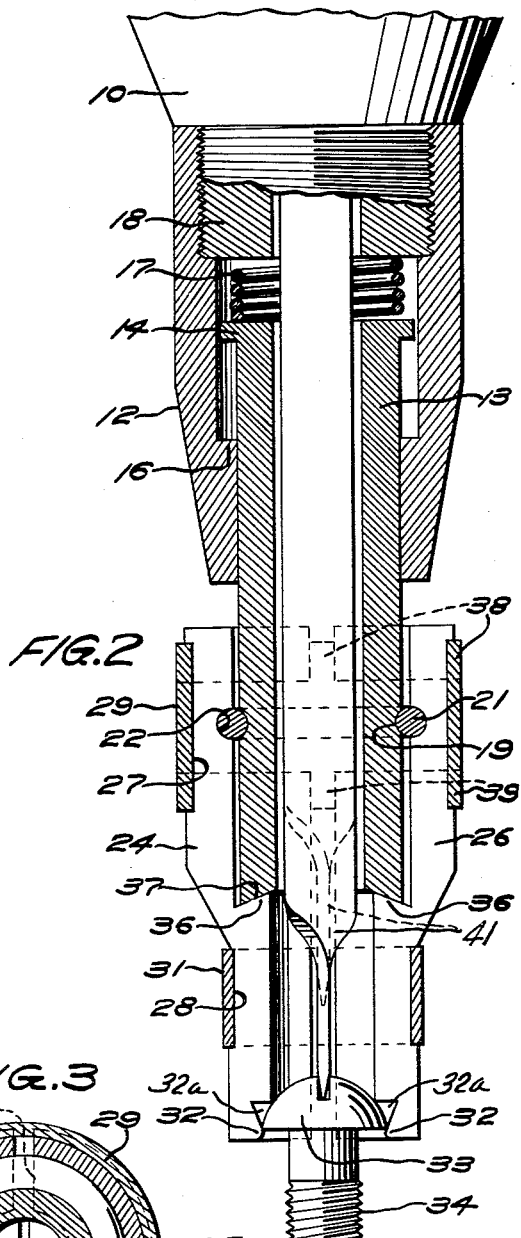
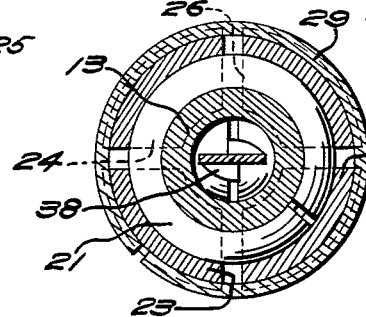
INVENTOR
L. O. LARSEN
BY R. P. Miller
ATTORNEY

United States Patent Office 2,942,637
Patented June 28, 1960

2,942,637

SCREW HOLDING ATTACHMENT FOR SCREW DRIVER

Leonard O. Larsen, Indianapolis, Ind., assignor to Western Electric Company, Incorporated, New York, N.Y., a corporation of New York Filed Mar. 11, 1958, Ser. No. 720,771

2 Claims. (Cl. 145—52)

This invention relates to a screw holding device for an automatic screw driver, and more particularly to a rigid jaw structure for holding a screw during a screw driving operation.

In conventional screw holding devices attached to automatic screw drivers, spring metal jaws are utilized. These tools are extensively used over prolonged periods of time; thus, subjecting the spring metal jaws to multiple stresses that ultimately result in failure either due to fracture or fatigue of the metal jaws.

A prime object of the instant invention is to provide, in an automatic screw driving machine, a screw holder having rigid gripping jaws.

Another object of the invention resides in rigid screw gripping jaws that may be readily deflected to grip a screw head prior to a screw driving operation.

A further object of the invention resides in screw holder jaws having beveled surfaces cooperating with beveled surfaces on a screw driver to relieve stresses imparted to resilient members girding the jaws and that tend to hold said jaws in a screw engaging position.

With these and other objects in view, the present invention contemplates an automatic screw driver of conventional manufacture having a plurality of circumferentially spaced rigid metal jaws confined by a spring metal band to grip and hold a screw head while the screw is being driven into a threaded receiving member. The upper ends of the jaws are beveled to cooperate with a complementary beveled sleeve on the screw driver to absorb the major downward thrust and counteract forces tending to spread the jaws during the screw driving operation.

Other objects and advantages of the present invention will be apparent from the following detailed description when considered in conjunction with the accompanying drawings, wherein Fig. 1 is a side elevational view of a conventional automatic screw driver having rigid screw head gripping jaws attached thereto in accordance with the principles of the present invention;

Fig. 2 is an enlarged sectional view taken along line 2—2 of Fig. 1 showing the screw driver in the screw driving position and particularly illustrating a beveled connection between the gripping jaws and a sleeve on the screw driver, and Fig. 3 is a full sectional view taken along line 3—3 of the other figures showing the circumferential spacing of the gripping jaws about a screw driving bit.

Referring to Fig. 1, there is shown a housing 10 for an automatic screw driver of conventional manufacture that may be initiated into operation by the depression of an actuating switch 11. Attached to the housing 10 is a hollow cylindrical nose piece 12 (see Fig. 2) adapted to slidably accommodate therein a tube-like member or sleeve 13 having a flange 14 formed thereon to engage a lip flange 16 inwardly extending from the lower terminus of the nose piece 12. A spring 17 interposed between the upper terminus of the sleeve 13 and an apertured plug screw 18 normally urges the sleeve downwardly so that the flange 14 engages the flange 16 to limit downward movement.

Sleeve 13 is provided with a circumferential groove 19 to receive a spring wire 21 that also fits within arcuate-shaped recesses 22 formed in four spaced arcuate-shaped jaws 23–26. The jaws 23–26 are provided with peripheral recesses 27 and 28 to accommodate spring metal split bands 29 and 31 that function to hold the jaws in engagement with the sleeve 13.

The lower terminus of each jaw is formed with a groove 32a to provide a seat having a cam surface 32 that is adapted to move beneath a head 33 of a screw 34 when the screw driver is moved to pick up a screw and hold the screw when the screw driver is in the screw driving position. The jaws 23 and 24 are formed to provide beveled abutments 36 that extend inwardly toward the center of the tool and cooperate with a beveled surface 37 formed on the lower end of the sleeve 13. The beveled surface 37 is formed at an acute angle with respect to the outer peripheral surface of the sleeve and cooperates with the beveled abutments 36 to urge the jaws together. The band 29 is provided with upwardly and downwardly extending projections 38 and 39 that fit between and space the jaws 23–26 on the sleeve 13.

In operation of the screw driver, the jaws 23–26 are moved over a head 33 of a screw 34 and moved downwardly so that the cam surfaces 32 react on the screw head to spread the jaws against the action of the spring bands 29 and 31. The screw head moves within the jaws and is gripped thereby so that during the subsequent screw driving operation the head is securely held while a screw driving bit 41 is moved downwardly into a slot formed in the screw head. When the housing 10 is depressed to move the screw driving bit 41 down into the screw driving position, the sleeve 13 compresses the spring 17 and the beveled surface 37 reacts on the beveled surfaces 36 of the jaws 23–26 to absorb the downward thrust and urge said jaws inwardly toward the screw head gripping position. The action of the beveled surface 37 on the beveled surfaces 36 relieves the stresses normally imparted to the spring bands 29 and 31 so that during the screw driving operations these elements are free of stresses that would tend to cause said members to ultimately fail by either fatigue or fracture.

It is to be understood that the above-described arrangement of apparatus and construction of elemental parts are simply illustrative of an application of the principles of the invention and many other modifications may be made without departing from the invention.

What is claimed is:

1. A screw holding attachment for a screw driver having an elongated bit comprising, a sleeve, means for mounting said sleeve around the bit and for longitudinal movement relative thereto, means for urging the sleeve downwardly toward the end of the bit, a plurality of rigid jaws disposed about the sleeve and having upper portions in laterally overlapping relation to the sleeve and lower portions projecting longitudinally beyond the end of the sleeve, said lower portions of the jaws having grooves engageable with a screw head for holding a screw, means interconnecting the upper portions of the jaws and the sleeve for longitudinal movement together and for pivotal movement of the jaws toward and from the axis of said sleeve, resilient means encircling the jaws for urging them radially inwardly into engagement with a screw head, cam surfaces on said jaws intermediate the ends thereof, and cam surfaces on the end of said sleeve cooperable with the cam surfaces on said jaws for moving the jaws radially inwardly in response to a downward thrust of said sleeve against said jaws.

2. A screw holding attachment for a screw driver having an elongated bit and a housing including a hollow nose portion comprising, a sleeve slidably mounted in the nose portion in telescoping relation to the bit and for longitudinal movement relative thereto, means for urging the sleeve in a direction toward the end of the bit, means for limiting the movement of the sleeve by the urging means, a plurality of rigid jaws disposed about the sleeve and having upper portions in laterally overlapping relation to the sleeve and having lower portions projecting longitudinally beyond the end of the sleeve, said sleeve having an annular groove, a split ring mounted in said groove, the upper portions of said jaws having grooves engaging said split ring for connecting the jaws to said sleeve for longitudinal movement therewith and for pivotal movement relative thereto toward and from the axis of said sleeve, a split spring band encircling said upper portions of the jaws to retain the jaws in engagement with said ring, said lower portions of the jaws having grooves engageable with a screw head for holding the screw, and a second split spring band encircling the lower portions of the jaws for urging said jaws radially inwardly into engagement with the screw head, said jaws having cam surfaces intermediate their ends sloping outwardly from the axis of said sleeve and downwardly toward said lower portions of the jaws, said sleeve having a beveled surface on the end thereof cooperable with the cam surfaces on said jaws for moving the jaws radially inwardly in response to an axial thrust of the sleeve against the jaws.

References Cited in the file of this patent

UNITED STATES PATENTS

| 2,658,538 | Kitterman | Nov. 10, 1953 |
| 2,684,698 | Shaff | July 27, 1954 |
| 2,762,408 | Baldwin | Sept. 11, 1956 |

FOREIGN PATENTS

| 596,167 | Germany | Apr. 27, 1934 |